No. 737,067. PATENTED AUG. 25, 1903.
W. S. BRANDT.
MECHANISM FOR THE REDUCTION OF PYROLIGNEOUS ACIDS.
APPLICATION FILED MAR. 8, 1900.
NO MODEL. 3 SHEETS—SHEET 1.

No. 737,067. PATENTED AUG. 25, 1903.
W. S. BRANDT.
MECHANISM FOR THE REDUCTION OF PYROLIGNEOUS ACIDS.
APPLICATION FILED MAR. 8, 1900.
NO MODEL. 3 SHEETS—SHEET 2.

Witnesses:
Geo. B. Pitts
J. S. Barker

Inventor:
Winfield Scott Brandt,
by his Attorneys,
Macomber & Ellis

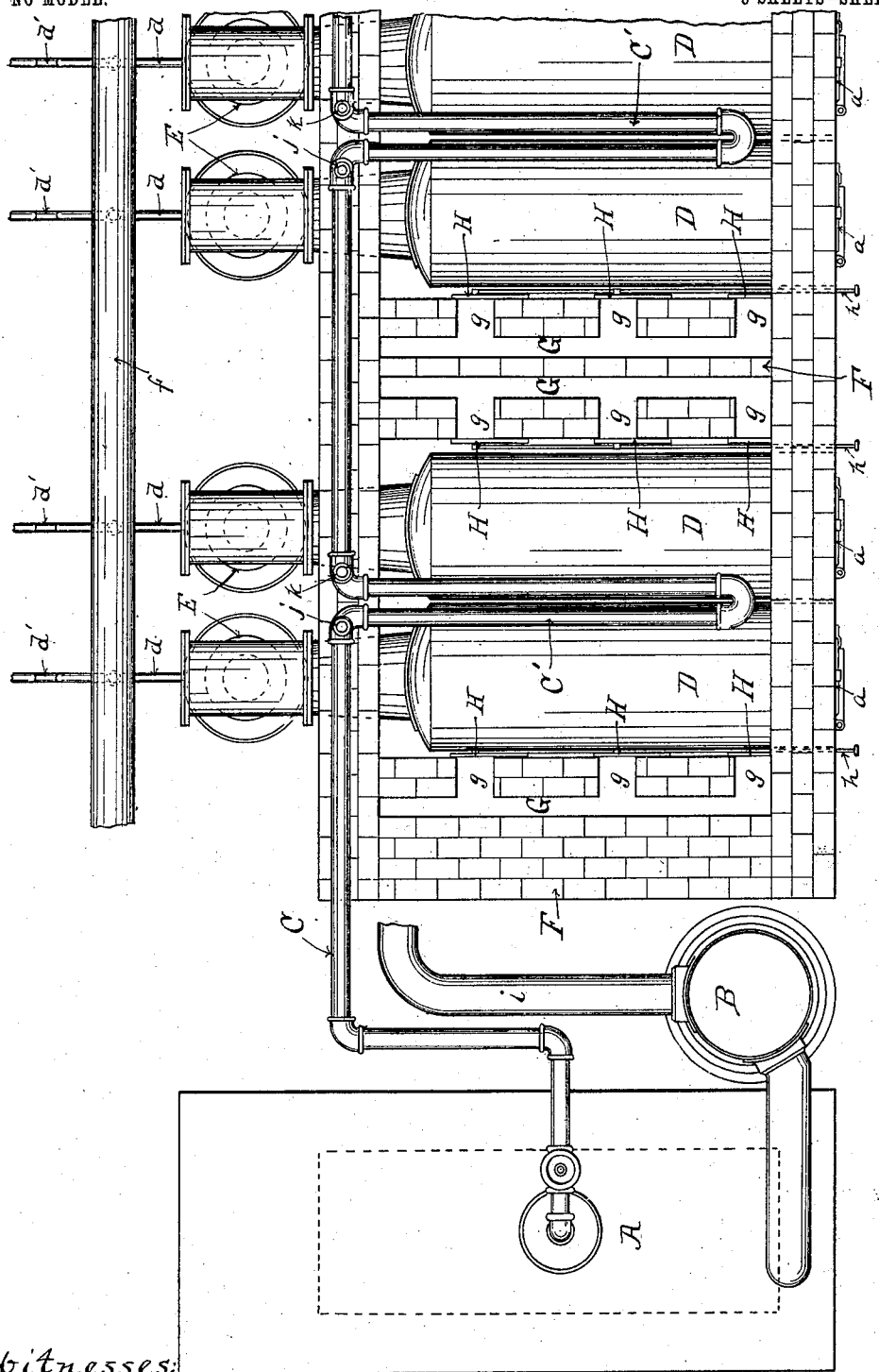

No. 737,067. Patented August 25, 1903.

UNITED STATES PATENT OFFICE.

WINFIELD SCOTT BRANDT, OF BINGHAMTON, NEW YORK.

MECHANISM FOR THE REDUCTION OF PYROLIGNEOUS ACIDS.

SPECIFICATION forming part of Letters Patent No. 737,067, dated August 25, 1903.

Application filed March 8, 1900. Serial No. 7,831. (No model.)

*To all whom it may concern:*

Be it known that I, WINFIELD SCOTT BRANDT, a citizen of the United States, residing at the city of Binghamton, in the county of Broome and State of New York, have invented certain new and useful Improvements in Mechanism for the Reduction of Pyroligneous Acids, of which the following is a clear, full, and exact description, such as will enable others skilled in the art to which it appertains to make and use the same.

My invention relates to mechanism for the reduction of pyroligneous acids and means for rendering the process continuous, economical, and effective as a commercial process.

In the mechanism and construction heretofore used there has been large loss, due to idleness of the plant incident to repair of any unit of the battery of retorts, condensers, and the like; also, much waste of heat has occurred and the efficiency of the plant has been much lessened by the large fall in temperature and pressure of steam supply incident to long lines of piping and absence of any means to overcome such fall in temperature and pressure after the steam leaves the boilers.

The object of my invention is therefore, first, to render it possible to recharge or repair any unit of the battery without any shut-down or loss to the remaining portions of the battery; second, to provide the stills and evaporating-pans with live steam, and, third, to save and utilize to the largest possible degree the heat formerly lost.

Figure 1:
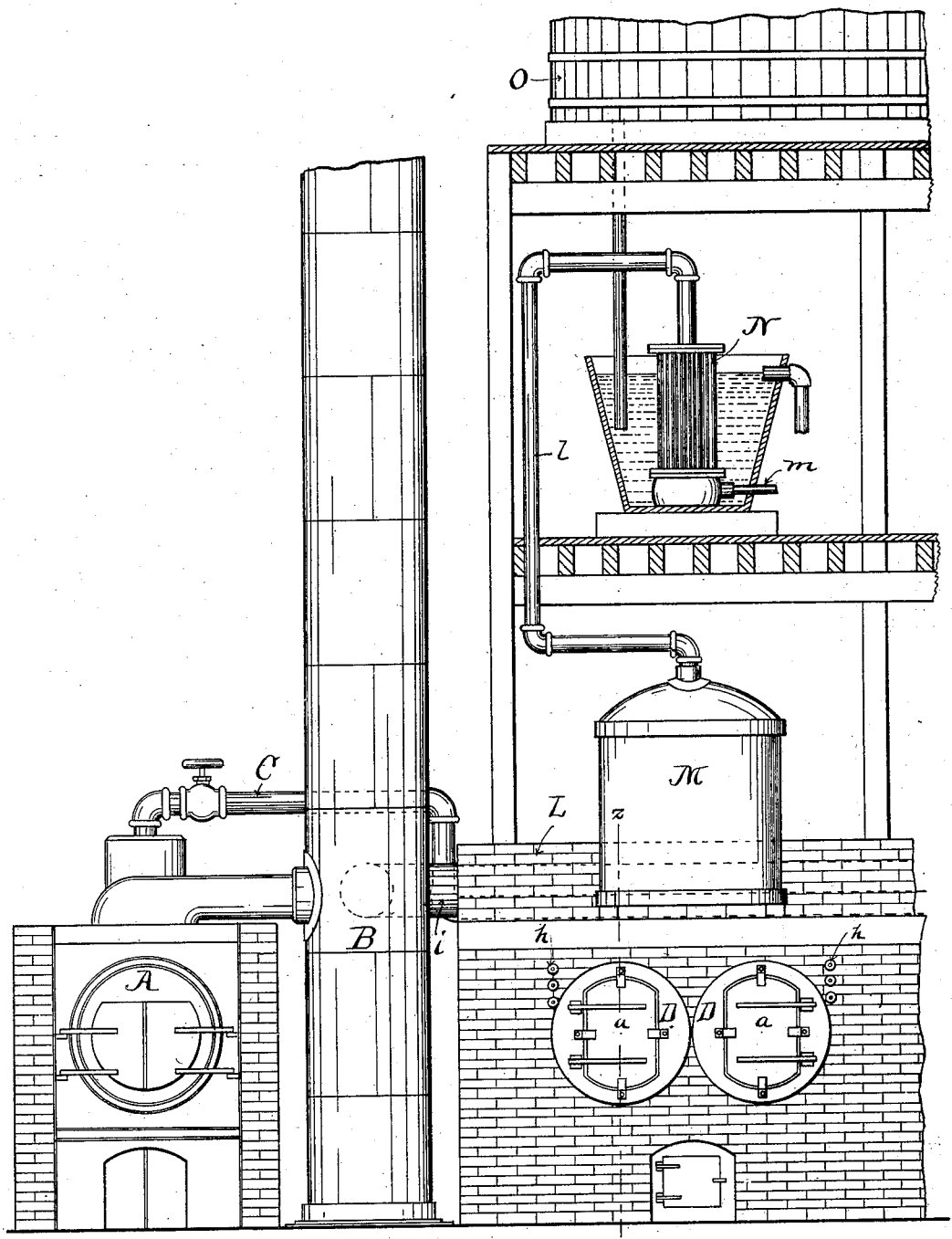
Figure 2:
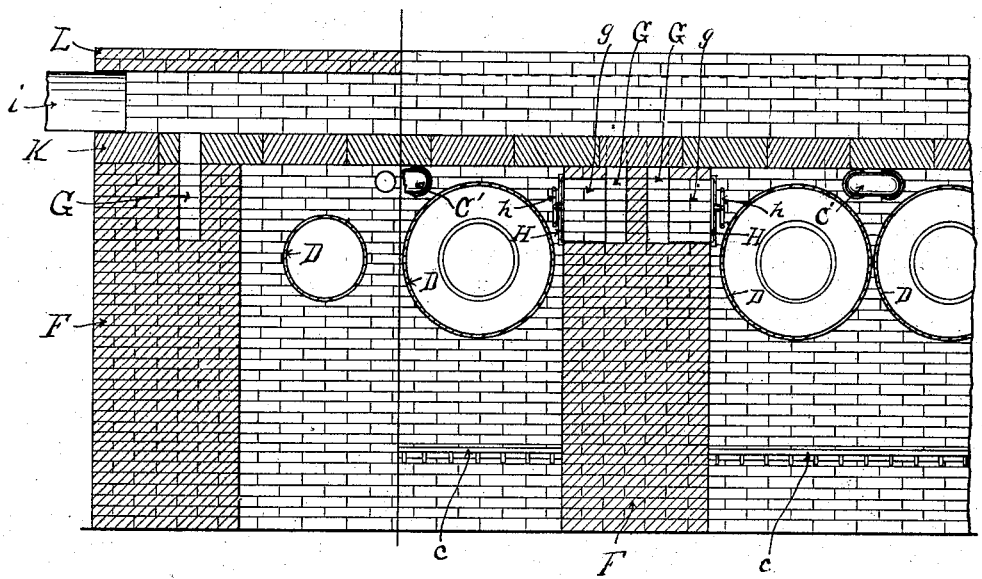
Figure 3:
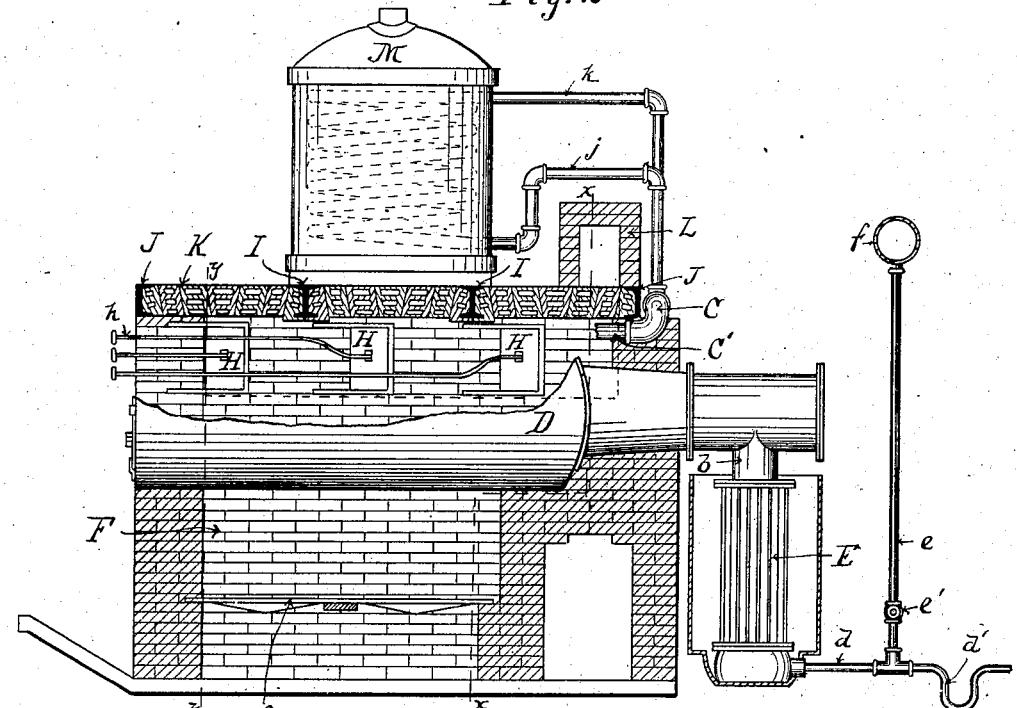

Referring to the drawings herewith, consisting of three sheets, in which like characters of reference indicate corresponding parts, Figure 1 is a front elevation of one unit or section of a plant equipped with my invention, showing the boiler and attendant mechanism for the generation of steam, a pair of retorts, a still, a condenser, and a source of water-supply for the condensers. Fig. 2 is a longitudinal vertical section of a portion of a battery of retorts, the portion at the left being on the line $x$ $x$ and the portion at the right being on the line $y$ $y$ of Fig. 3. Fig. 3 is a vertical section on the line $z$ $z$ of Fig. 1. Fig. 4 is a top view of a portion of a battery of retorts with the longitudinal flue and covering to the fire areas removed.

A represents a boiler or battery of boilers which supply steam for the stills and evaporators and perform such other duties as are incident to the process.

B represents a smoke-stack which serves the boilers and the battery of retorts, as hereinafter described.

C represents a steam pipe or main leading from the dome of the boiler or boilers A, which supplies steam to the stills and evaporators, as hereinafter more fully described.

D represents the retorts, which are of the ordinary bottle-shaped type and which are set in brickwork and at the larger end are provided with doors $a$ for filling with the wood to be destructively distilled and at the smaller end with eduction-pipes $b$, leading to condensers, as hereinafter described. Grates $c$ are provided underneath the retorts D, upon which fires are laid to produce the destructive distillation of the wood placed in the retorts D. When the retorts are filled with wood for reduction, the doors $a$ are luted to prevent any escape of the gases at the joints.

E represents condensers of the usual type, which are provided with trapped exits $d$ for the condensed acids, and from a point in the pipe $d$ between the condenser and the trap $d'$ a pipe $e$, provided with a valve $e'$, leads up to a main $f$, which carries the uncondensed gases away for further treatment, but which is no part of this invention. The gases produced by the distillation of the wood in the retort create sufficient pressure to drive said gases down through the condensers and the uncondensed portions up to the main $f$, while the traps in the exits $d$ permit of the flow of the condensed gases, but prohibit the flow of the uncondensed gases.

F represents transverse partition-walls, which carry the covering and which preferably separate the retorts in pairs. By placing the retorts thus in pairs a single fire heats the two, thus saving fuel.

G represents flues in the walls F, which extend from the inside of the front wall to the inside of the rear wall. At their rear ends these flues G open upwardly into the longitudinal flue L, hereinafter described. Side openings $g$ connect the fire areas about the retorts D with the flues G. The openings $g$ are provided with dampers H, which are so constructed that by means of rods $h$ they may be employed separately to regulate the draft or may be all entirely closed to cut off any unit of the battery system from the flue system when desired. Over the fire areas and the flues G and the walls F is a covering consisting of channel-beams J, I-beams I, and fire-clay flooring K. This construction is wholly supported on the transverse walls F, so that the front and rear walls may be taken down without disturbing the covering or any of the structures placed thereon. Upon this covering is constructed a longitudinal flue L, which extends the entire length of the battery and connects by a pipe $i$ with the stack B. As stated, each of the flues G opens upwardly into this flue L, so that each fire area is connected with the stack B and so that each fire area may be cut off by dampers from connection with the stack through the flues. The products of combustion pass into the openings $g$ through the flues G and upwardly to the flue L, through the flue L to the pipe $i$, and thence to the stack B. The gases generated in the retorts D pass through the necks, down through the pipes $b$ and the condensers E. The condensed gases pass out through the pipes $d$ and traps $d'$ to receptacles (not shown) afterward to be subjected to further treatment, while the uncondensed gases pass upwardly through the pipes $e$ to the main $f$, from which they pass to other apparatus (not shown) for further treatment.

The first feature of my invention is now apparent. Each unit of the battery is segregable from the system. By closing the dampers H in any unit the connection with the flue system is cut off, and by closing the valve $e$ the connection with the main $f$ is cut off. The unit so cut off may be recharged or entirely taken down for repairs without disturbing any unit either side of it or disturbing any of the superposed structure.

Referring now to the steam-main C, it passes from the boiler along the top of the rear wall and directly over each pair of retorts passes downwardly into the fire area and toward the front in the form of a U, as clearly shown at C' in Fig. 4, and thence along the rear wall to the next unit, where a similar detour is made, and so on. Now as the temperature of the fire areas is in the vicinity of 700° it is evident that at whatever point the steam-main is tapped to supply stills or evaporating-pans superheated steam is secured. This renders evident the second feature of my invention—namely, means for supplying all of the stills and evaporating-pans with superheated steam. Heretofore as the distance from the boiler increased both temperature and pressure fell, thus reducing the efficiency of the stills and evaporators with the distance traveled by the steam until the economical limit was soon reached. By my process and construction I not only increase the economy of an existing plant, but render possible a construction heretofore impossible.

In order that the next feature of my invention may be the better understood, I will explain briefly the main steps in the ordinary treatment of the liquid product which passes out at the pipe $d$. It is first put into a still and heated in the usual manner to separate the tarry compounds which thus far accompany the liquid. The acids are driven from the still by the heat and are then passed to an ordinary condenser. Thus condensed they are free from tarry compounds and are ready to be resolved into wood-alcohol and acetate. This process consists of thoroughly neutralizing the acids with ordinary lime. Thus thoroughly mixed with sufficient lime to neutralize the acids the mixture is put into another still and subjected to heat, as above described. The wood-alcohol is evaporated and condensed in a condenser, when it is ready to be subjected to the final processes to free it from water to prepare it for market. The residuum in the still is a thick mass which is acetate of lime. This is first put into evaporating-pans and boiled down, and then is spread on a hot surface or kiln and dried, when it is bagged and is ready for market.

It will be understood that if gray acetate is to be made a copper still will be employed in separating the acids from the tar, while if brown acetate is to be made the stills may be of iron. With this general explanation, referring especially to Figs. 1 and 3, M is a still, of any desired form, situated upon the covering of the battery of retorts. Inlet and outlet pipes $j$ and $k$ (see Fig. 3) connect the steam-main C with a coil within the still. (Indicated in dotted outline in this figure.) Into this still the liquid product of the destructive distillation is pumped (by means not shown) and is subjected to heat, and it will be noted that by the placing of the still upon the covering of the fire areas considerable heat otherwise lost is put to use. The heat drives the acids through the pipe $l$ (see Fig. 1) to the condenser N, which is cooled by water from a tank O, and the condensed acids are drawn off through the pipe $m$ for the next treatment. Having been neutralized as above described, the mixture is put into another still M, situated at another point on the covering to the battery of retorts, similarly connected to the main C by pipes $j$ and $k$ and connecting with another condenser N. The wood-alcohol is driven off by heat and recovered at another exit $m$. The acetate remaining in the still is put into an ordinary steam-evaporator placed upon the covering to the battery at another point, which is heated through steam connections $j$ and $k$, leading from the main C, identically the same as above described with reference to the stills. Finally the acetate is spread out on the unoccupied portions of the covering to the retorts and is dried by the heat conducted by said covering from the fire areas. The third feature of my invention is now apparent. By so constructing the battery of retorts I support the stills and evaporating-pans upon a heated surface, and thus utilize heat hitherto lost in the processes of distillation and evaporation. Moreover, as the superficial area of the retort-covering is considerably in excess of that occupied by the stills and evaporating-pans the surplus is advantageously used to dry the acetate as above described, dispensing with a separate kiln. This construction, forming a kiln, is of great importance, which will be at once recognized by one skilled in the art, since it saves floor-space substantially equal to the superficial area of the battery-covering and the corresponding requirement of heat. The construction may be either the fireproof construction shown or brick-arch construction; but in either case skewbacks should be employed to protect the I-beams against the heat of the fire-chambers.

Having thus described my invention and its method of operation, what I claim is—

1. In an apparatus adapted for use in the reduction of pyroligneous acid, the combination of a battery of retorts, independent fire-chambers for the retort units, separating transverse partitions, a main flue carried by said transverse partitions, independent flues in the said transverse partitions arranged to connect each fire-chamber with the main flue, means for cutting off each fire-chamber from the main flue, and front and back walls supporting the retorts capable of being removed independently of the transverse partitions and the main flue, whereby any unit of the battery may be cut in or cut out or the retorts of the unit removed or replaced without interfering with the operation of the other units of the battery, substantially as and for the purposes set forth.

2. In an apparatus adapted for use in the reduction of pyroligneous acid, the combination of a battery of retorts, an independent fire-chamber for each retort unit, transverse partitions separating the said fire-chambers, a main flue carried by said transverse partitions, independent flues arranged in said transverse partitions, and each connected with the main flue and with one of the fire-chambers through separate openings $g$ arranged longitudinally of the retort-chambers, independent dampers and means for regulating them controlling said openings $g$, and front and back walls supporting the retorts capable of being removed independently of the transverse walls and the main flue, whereby any unit of the battery may be cut in or cut out and the retorts of the unit removed or replaced without interfering with the other units of the battery, substantially as and for the purposes set forth.

3. In an apparatus adapted for use in the reduction of pyroligneous acid, the combination of a battery of retorts disposed in units, each battery unit in a separate fire-chamber, separating-partitions between the fire-chambers, separate flue connections for each fire-chamber, means for controlling such flue connections, a main flue and a cover common to all of said fire-chambers resting upon and carried by said separating-partitions, front and back walls carrying said retorts and capable of being removed or replaced without disturbing said partition-walls or said main flue or covering, whereby any unit of the battery may be cut in or cut out or the retorts of the unit removed or repaired without interfering with the operation of the other units of the battery, substantially as and for the purposes set forth.

4. The combination of a battery of retorts, an independent fire-chamber for each retort unit, transverse partitions separating the fire-chambers, a covering common to all of said fire-chambers resting upon and carried by said transverse partitions, a main flue L supported upon the said covering and independent flue connections between each fire-chamber and the said main flue and front and back walls carrying said retorts capable of removal and replacement by battery units without disturbance of the other units of the battery, substantially as and for the purposes set forth.

5. The combination of a battery of retorts arranged in a series of independent fire-chambers, transverse walls separating the fire-chambers, a main flue carried by said transverse walls, a refractory covering supported by said transverse walls and extending over all of said fire-chambers, front and back walls supporting said retorts capable of removal and replacement by battery units without disturbance of the other units of the battery, and vessels to be heated supported by said covering over the retort-chambers, these parts being arranged substantially as described, whereby a retort unit may be repaired or removed without interfering with the covering and vessels carried thereon and arranged over such retort unit, substantially as and for the purposes set forth.

6. The combination with a battery of retorts and a steam-generator, of a supply-pipe leading from said generator, independent means for heating the steam conveyed through the said supply-pipe situated at separate points distant from said generator, comprising said battery of retorts and bends or loops in said supply-pipe extending into the fire areas of said retorts, stills and evaporators situated on the deck of said battery of retorts, and means for leading superheated steam from the said supply-pipe to said stills and evaporators and for returning the steam from said stills and evaporators to the supply-pipe, substantially as set forth.

7. The combination with a battery of retorts and a steam-generator, of a steam-supply pipe leading from said generator, independent means for superheating the steam which passes through said supply-pipe and situated at separate points distant from the generator, comprising said battery of retorts and U- shaped bends in said supply-pipe extending into the fire area of said retorts, a deck covering said battery of retorts, stills and evaporators situated on said deck for distilling and drying the products of said retorts, heating connections arranged to lead steam from the supply-pipe adjacent to each superheater, and to return the steam to the main supply-pipe after it has been used for heating purposes, substantially as set forth.

In testimony whereof I have hereunto set my hand in the presence of two witnesses.

WINFIELD SCOTT BRANDT.

Witnesses:
    H. C. COLLIER,
    F. J. ROOT.